United States Patent [19]

Beier et al.

[11] Patent Number: 4,751,702

[45] Date of Patent: Jun. 14, 1988

[54] IMPROVING AVAILABILITY OF A RESTARTABLE STAGED STORAGE DATA BASE SYSTEM THAT USES LOGGING FACILITIES

[75] Inventors: Harley A. Beier, Morgan Hill, Calif.; Takeshi Fukumoto, Yokohama, Japan; Harrison Scofield, Morgan Hill; Vern L. Watts, Los Gatos, both of Calif.

[73] Assignee: International Business Machines Corporation, Armonk, N.Y.

[21] Appl. No.: 828,113

[22] Filed: Feb. 10, 1986

[51] Int. Cl.$^4$ ............................................. G06F 11/20
[52] U.S. Cl. ......................................... 371/9; 364/200
[58] Field of Search ............... 371/9, 12; 364/187, 364/200, 900

[56] References Cited

U.S. PATENT DOCUMENTS

| | | | |
|---|---|---|---|
| 4,099,241 | 7/1978 | Ossfeldt | 364/200 |
| 4,351,023 | 9/1982 | Richer | 364/187 |
| 4,371,754 | 2/1983 | De et al. | 371/9 X |
| 4,412,281 | 10/1983 | Works | 364/200 |
| 4,443,849 | 4/1984 | Ohwada | 364/200 |
| 4,453,215 | 6/1984 | Reid | 364/200 |
| 4,507,751 | 3/1985 | Gawlick et al. | 364/900 |
| 4,567,560 | 1/1986 | Polis et al. | 371/12 X |
| 4,610,013 | 9/1986 | Long et al. | 371/9 |
| 4,635,184 | 1/1987 | Schuss | 364/187 |

*Primary Examiner*—Charles E. Atkinson
*Attorney, Agent, or Firm*—Simon K. Lee

[57] ABSTRACT

A method is disclosed for maintaining availability of a restartable data base system where continuity of service is guaranteed by having a loosely-coupled backup processor taking over processing of a degraded active processor. The backup processor continuously tracks the activities of the active processor to ascertain data set elements updatable by the active processor. Upon switchover, images of data set elements updatable by the degraded active processor are created in the buffer of the backup processor. By making references and updates to the images, processing of the backup processor can start immediately after switchover. Upon preventing the degraded active processor from making further updates, the backup processor writes the images back to the data base.

2 Claims, 12 Drawing Sheets

IMS/XRF PHASES

```
************************************************************************
***    READ THE LOG                                                    *
************************************************************************
 1           SPACE 1
 2   LOGREAD DS    0H
 3           LTR   R15,R15              RC FROM PROC LAST RECORD
 4           BNZ   ABND168              ISSUE ABEND
     *.. START SURVEILLANCE HERE IF ALL THE DC PREOPEN FINISHED.
     *.. THE SURVEILLANCE HAS NOT STARTED YET.
 5           L     R14,SCDFRB           LOAD FRB POINTER
 6           LTR   R14,R14              XRF ENVIRONMENT?
 7           BNM   LOGREAD1             ELSE, DON'T BOTHER.
 8           USING FRB,R14              SET FRB BASE
 9           TM    FRBSRVF1,FRBSRVIN    SURVEILLANCE FUNC INITIATED?
10           BO    LOGREAD1             THEN, DON'T BOTHER.
11           TM    FRBPOPNN,X'08'       DC PREOPEN HAS COMPLETED?
12           BNO   LOGREAD1             ELSE, DON'T BOTHER.
13           DROP  R14                  RESET FRB BASE
14           L     R15,=A(SURVSTAT)     SURVEILLANCE STATUS ROUTINE
15           BALR  R14,R15              START SURVEILLANCE
16   LOGREAD DS    0H
17           L     R15,TAPEGET          A(GET ROUTINE)
18           BALR  R14,R15              GET RECORD
19           LTR   R15,R15              OKAY?
20           BZ    LOGTYPE              YES - DETERMINE TYPE
21           CH    R15,=H'4'            END OF FILE ON LOG?
22           BNE   ABND3141             NO - ERROR
23           B     LOGEOF               YES
```

READING THE ACTIVE'S SYSTEM LOG

Fig. 5

```
****************************************************************
    ***    DETERMINE THE RECORD TYPE                           *
****************************************************************
 1              SPACE   1
 2              USING   LOG01,R2
 3   LOGTYPE    DS      0H
 4              LR      R2,R1              LOG RECORD REG
 5              SR      R1,R1              ZERO
 6              IC      R1,CHKLCODE        GET LOG RECORD TYPE
 7              L       R14,LOGRECXA       GET A(LOGRECXT)
 8              IC      R1,0(R1,R14)       GET BRANCH TABLE INDEX
 9              B       LOGBR(R1)          GOTO PROPER ROUTINE
10   LOGBR      DS      0H                 TYPE      WHERE TO
11              B       LOGREAD    0       6F, 71-FF - GET NEXT RECORD
12              B       LOG0056    4           56    - DFSRESP0
13              B       LOG005A    8          5A-6C  - DFSCRSP0
14              B       LOG0059    C           59    - DBFERST0
15              B       LOG0050   10       50-53, 41 - DFSRBLB0
16              B       LOG004C   14           4C    - DFSRDBP0
17              B       LOG0047   18           47    - DFSRDBP0
18              B       LOG0040   1C           40    - DFSRLP00 + OTHERS
19              B       LOG0037   20           37    - DFSCRSP0, DFSRBLB0,
20              B       LOG0007   24         07-08   - DFSRDBP0
21              B       LOG0006   28           06    - DFSRBLB0
22              B       LOG005A1  2C          REST   - DFSCRSP0
23              B       LOG0038   30           38    - DFSCRSP0 + DFSRBLB0
24              B       LOG0070   34           70    - DFSICV90
25              B       LOG006D   38           6D    - DFSRLP00
26              B       LOG0025   3C           25    - DBFTOLR0 OR DFSTOLR0
27              B       LOG0026   40           26    - DBFTOLR0 OR DFSTOLR0
28              B       LOG0020   44         20-21   - DFSRDBP0,DFSHRDB0
29              B       LOG0027   48           27    - DFSRELP0
```

PROCESSING THE ACTIVE'S LOG RECORDS

Fig. 6

```
     ****************************************************************
     ***   CHECKPOINT LOG RECORDS - '40'                            *
     ****************************************************************
 1            SPACE  1
 2            USING  LOG01,R2
 3   LOG0040  DS     0H
 4            L      R14,SCDFRB         A(FRB)
 5            USING  FRB,R14            SET ADDRESSABILITY
 6            LTR    R14,R14            AN XRF SYSTEM?
 7            BNM    LOG00402           NO, SKIP XRF CODE
 8            TM     FRBFLAG1,FRBACTV+FRBRSTRT THE ALTERNATE SYS?
 9            BNO    LOG00402           NO, MUST NRE/ERE
10            TM     RSTCTL2,RST2X80    BLDQ COMPLETED?
11            BO     LOGREAD            YES, GET NEXT RECORD
12            SPACE  1
13            DROP   R14
14            SPACE  1
15   LOG00402 DS     0H
16            LR     R0,R1              DEBUG
17            SR     R1,R1              ZERO
18            IC     R1,CHKTYPE         GET CHKPT RECORD TYPE
19            L      R14,CHKRECXA       A(CHKRECXT)
20            IC     R1,0(R1,R14)       GET BRANCH TABLE INDEX
21            B      LOG40BR(R1)        GOTO PROPER ROUTINE
22   LOG40BR  DS     0H
23            B      LOGREAD   0        READ NEXT RECORD
24            B      LOG4001   4        4001 START CHECKPOINT
25            B      LOG4002   8        4002 MESSAGE QUEUE
26            B      LOG4003   C        4003-4005, 4008-4014 & 4020
27            B      LOG4006   10       4006-4007 & 4015
28            B      LOG4030   14       4030 DFSRESPO
29            B      LOG4070   18       4070-4079 MSDB LOG RECORDS
30            B      LOG4080   1C       4080 FAST PATH
31            B      LOG4098   20       4098 END CHECKPOINT
32            B      LOG4099   24       4099 END MESSAGE QUEUE
33            B      LOG4025   28       4025 EEQE
34            B      LOG4026   2C       4026 IOT BUFFER
```

Fig. 7    PROCESSING THE ACTIVE'S SNAPQ CHECKPOINT

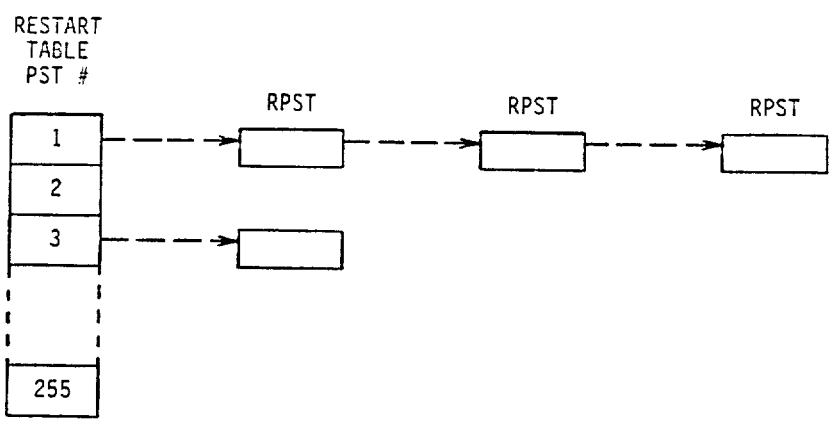
Fig. 8    DEPENDENT REGION RESTART TABLE STRUCTURE
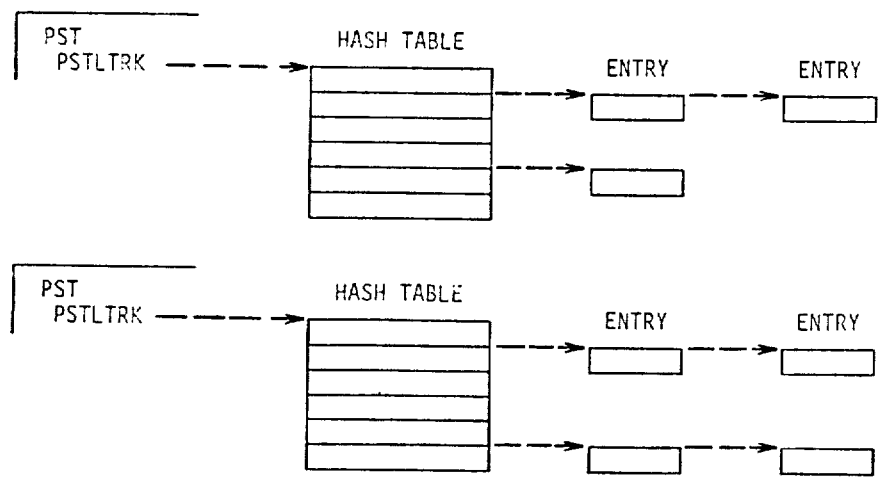
Fig. 9    DL/I LOCK TRACKING: POOL STRUCTURE

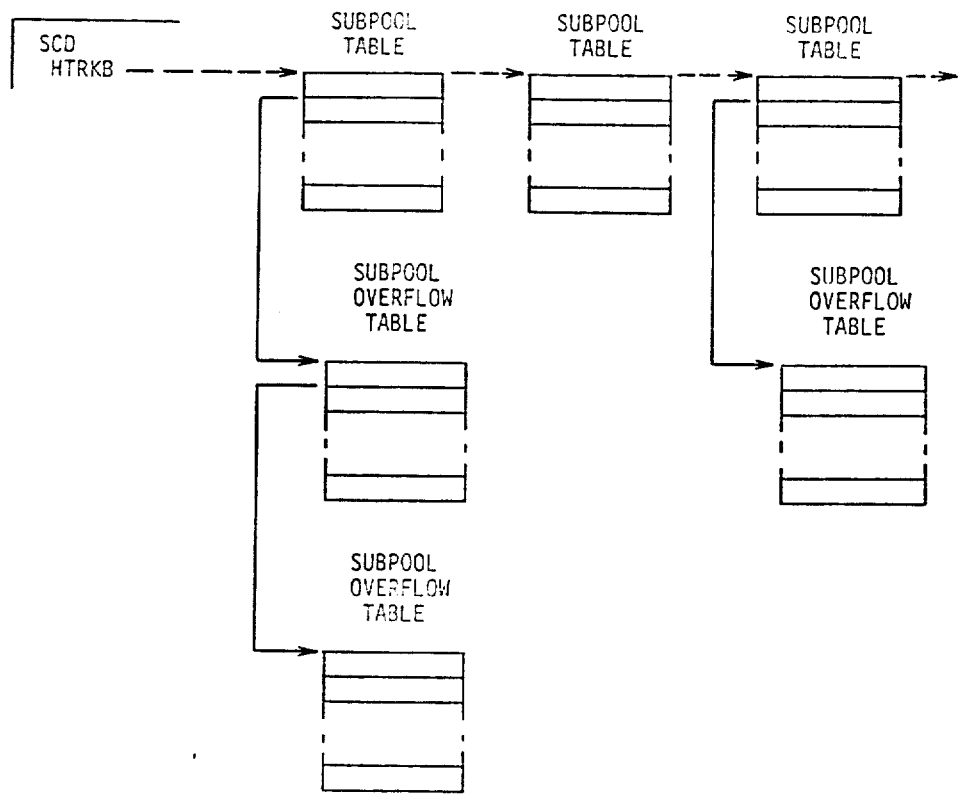
Fig. 10  DL/I BUFFER TRACKING POOL STRUCTURE
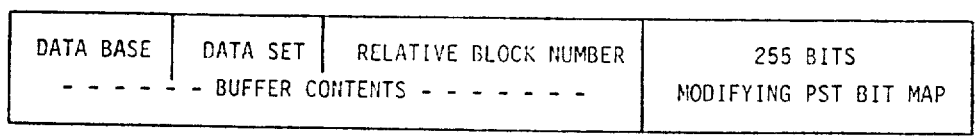
Fig. 11  DL/I BUFFER TRACKING TABLE ENTRY

FAST PATH "INDOUBT" BUFFER REDUCTION

IMPROVING AVAILABILITY OF A RESTARTABLE STAGED STORAGE DATA BASE SYSTEM THAT USES LOGGING FACILITIES

TECHNICAL FIELD

This invention relates to transaction-oriented, fault-tolerant systems, and more particularly, to a transaction-oriented data base managed by an active processor with management replaceent being made by a backup processor tracking and synchronizing its information state from the active processor's log.

BACKGROUND OF THE INVENTION

In the copending application, Ser. No. 06/792,371, filed Oct. 19, 1985, entitled "Data Availability in a Restartable Data Base System" and assigned to the assignee of the present invention, there is disclosed a method for ensuring swithover in a restartable data base sysem between a backup and a degrading active processor. By transferring workload of a degraded processor to a backup processor, continuity of service of the data base system is guaranteed.

However, as will be more fully described hereinafter, even though control may have passed to the backup processor, it is possible that, after switchover, concurrent references to the same data base may still be made by both the degraded and the backup processors. To maintain data integrity of the system after switchover, there needs to be a delay in the processing of the backup until references or updates by the degraded processor are stopped.

In prior art data processing systems, concurrent access to shared data is resolved by serialization achieved by methods such as prioritization, locking, enqueuing or semaphores. While such methods preserve the order of access, they nevertheless cannot ensure data integrity because either processor may alter the data being used by the other.

THE INVENTION

It is an object of this invention to facilitate an early restart by a pickup processor of a restartable data base system. A related object of this invention is to provide a method whereby the early restart can be accomplished without destroying integrity of data associated with interrupted transactions.

The above object is believed satisfied by a method comprising the steps of (a) ascertaining the names and locations of the data set elements in staged storage which are updatable by the active one of two processors, and upon the passing of control from the active (which becomes the old active processor) to the other processor, logging the ascertained names and locations; (b) ascertaining whether the degraded active processor ceases to perform updates to staged storage; (c) upon the first reference to each data set element in staged storage by said other processor (which becomes the new active processor), creating an image by copying the referenced element to a buffer, diverting subsequent references from staged storage to the image in the buffer, logging each update to the image in the buffer, the steps of copying, diverting, and logging being repeated until said old active processor ceases to perform updates to staged storage; and (d) then writing the buffer images back to staged storage.

The principal advantage resulting from the practice of this method is minimal stoppage of processing in a data base system and maintenance of data integrity even in the event of a processor degradation.

BRIEF DESCRIPTION OF THE DRAWING

FIG. 3 illustrates the active and alternate data base system configuration according to the invention.

FIGS. 5-7 set out assembly-level language code traces for respectively establishing an optional link, reading the active processor's log, processing the active processor's log records, and processing the active processor's snapshot checkpointing activity.

FIG. 8 sets out a dependent region restart table structure.

FIGS. 9-11 depict structures involved in lock and buffer tracking of pool structures and buffer tracking table entries.

DESCRIPTION OF THE PREFERRED EMBODIMENT

To better understand the improved method of the present invention, the method according to the above-identified earlier filed copending application will first be briefly described.

Figure 1:
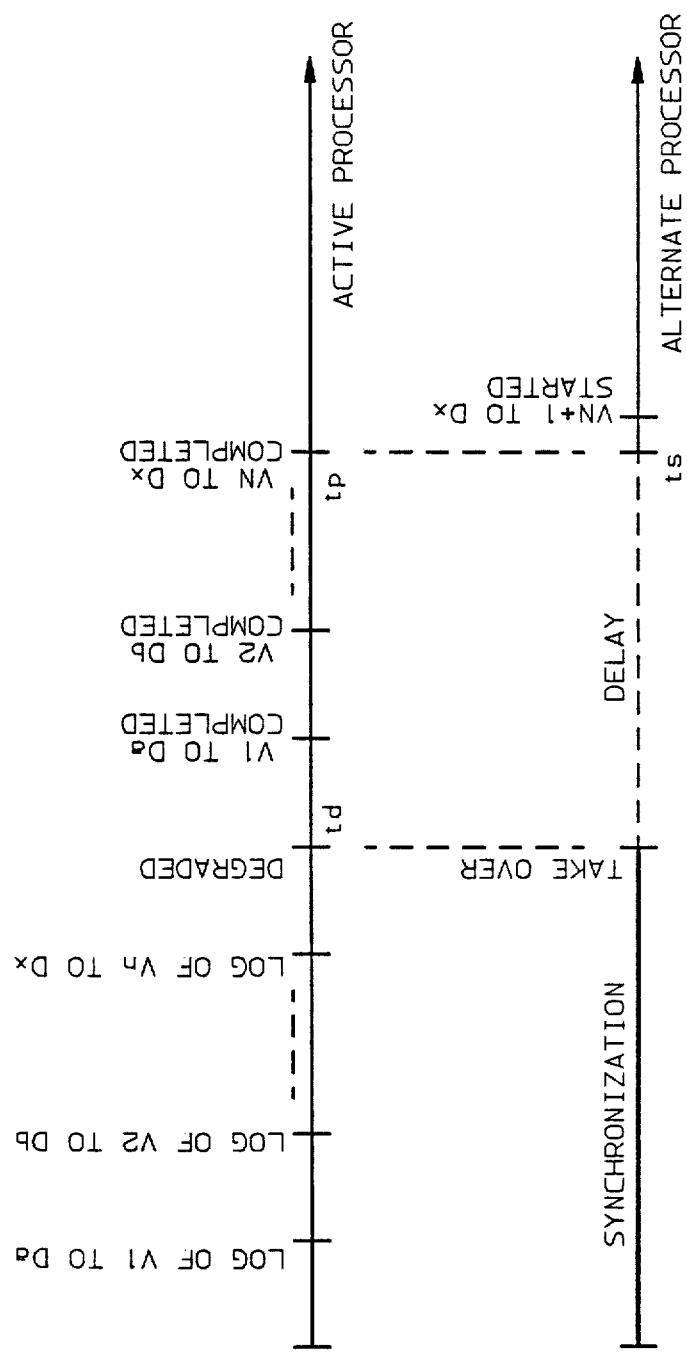
FIG. 1 is a diagram depicting the normal sequence of data base accesses upon degradation of the active processor according to the method disclosed in the aboveidentified copending application.

FIG. 1 illustrates the events which may occur immediately before and after a switchover in the system of said copending application. Prior to degradation, the active processor needed to make n updates V1, V2, . . . , Vn to the data base. Accordingly, log entries L1, L2, . . . , Ln of the corresponding updates were first written to the log as required by the Write Ahead Logging protocol. Write Ahead Logging protocol is well recognized to prior art (see U.S. Pat. No. 4,507,751, Gawlick et al, "Method and Apparatus for Logging Journal Data Using a Log Write Head Data Set") and is used by IMS to guarantee recoverability of data base updates.

When the active processor degraded at time td, it was prohibited from writing into the log. However, since entries L1, L2, . . . , Ln had already been logged, the old active processor could still write V1, V2, . . . , Vn to the data base. To maintain data integrity, the backup processor could not make updates to the data base until after time tp, when the degraded processor finished writing V1, V2, . . . , Vn to the data base. Therefore, processing of the backup proessor and, consequently, the availability of the data base system must be delayed to time tp.

Since number n of updates is usually large, the delay of processing (i.e., the time between td and tp) of the backup processor may be significant. Therefore, although the invention of the copending application can successfully provide a continuity of service of the data base system, there is a need for an improvement whereby processing of the backup processor can start immediately upon switchover.

Figure 2:
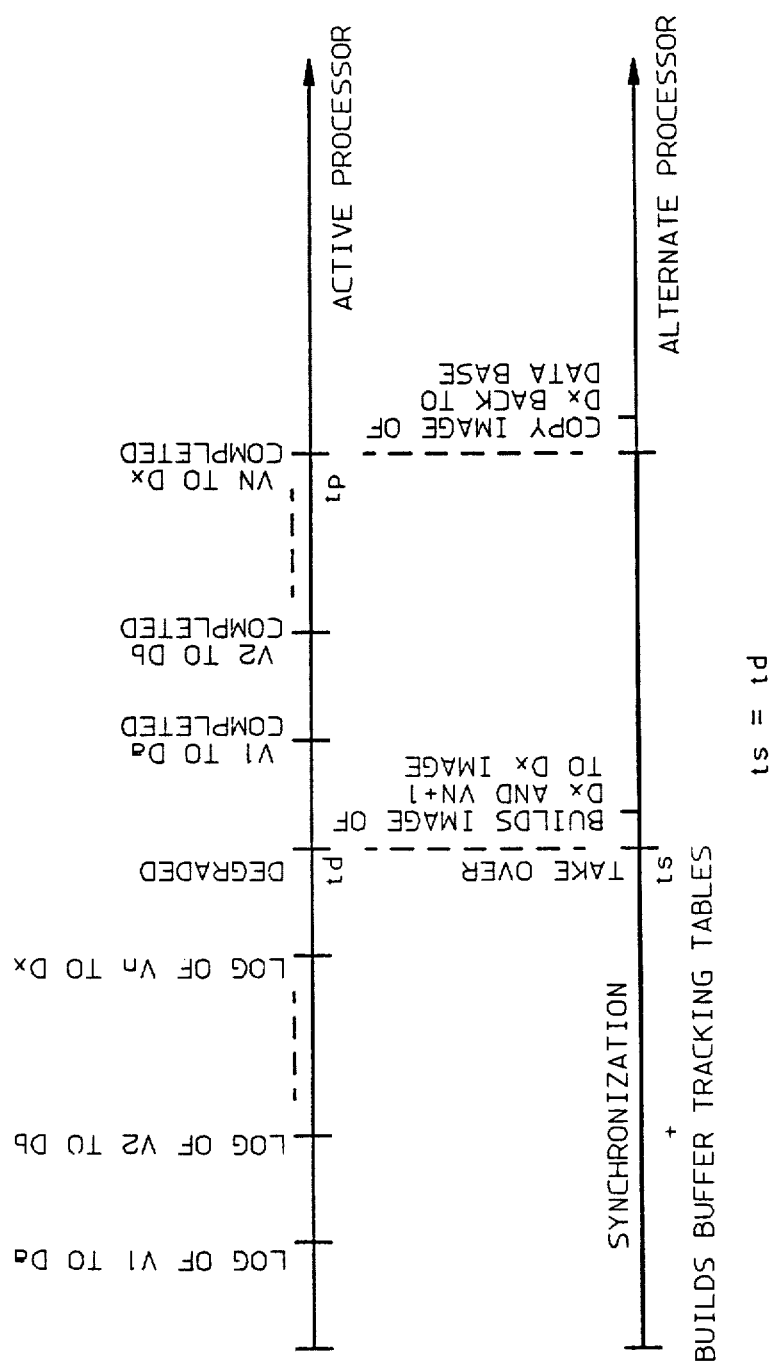
FIG. 2 is a diagram depicting the sequence of data base accesses and system availability improvement when the method of this invention is incorporated into the system of the above-identified copending application.

In accordance with the present invention, and as illustrated in FIG. 2, the backup processor tracks data set elements Da, Db, ..., Dx which are updatable by the active processor. Upon switchover at time td, if the backup processor needs to reference a data set element Dx which is one of the data set elements updatable by the degraded processor, it builds an image of Dx in its buffer and diverts all reference to this image. When the degraded processor finished writing V1, V2, ..., Vn to the data base at time tp, the image of Dx is written back to the data base. By diverting references of Dx to its buffer image, processing of the backup processor can start immediately upon switchover at td.

Figure 3:
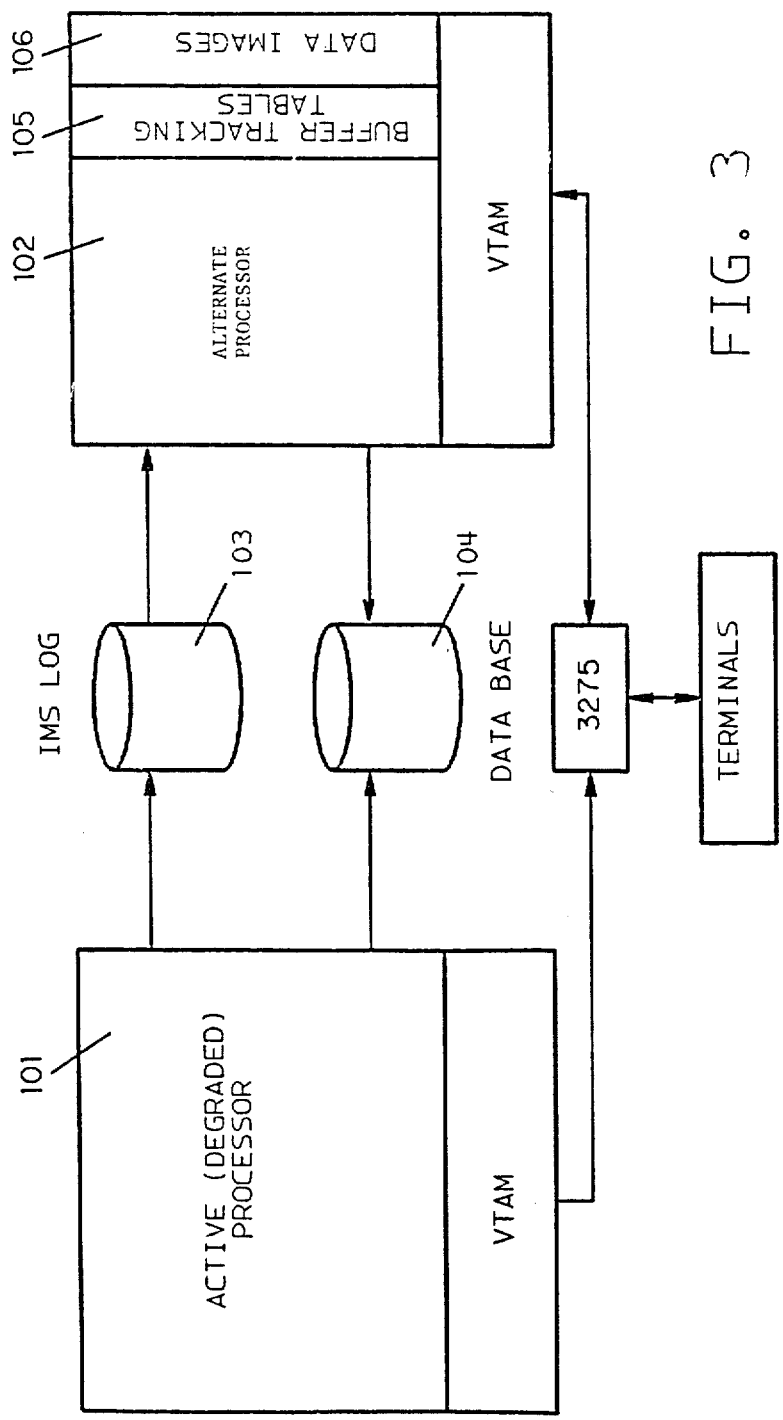
FIG. 3 is a schematic diagram of the system disclosed in said earlier filed application modified in accordance with the present invention.

Referring now to FIG. 3, there is shown a configuration of active and backup, or "alternate", processors according to the preferred embodiment of the above-identified copending application. A sample Information Management System/Extended Recovery Facility (IMS/XRF) configuration has been used in said preferred embodient. The IMS terms used in connection therewith are:

Data Language/I (DL/I) and Fast Path refer to two alternative data manipulation languages that a user can choose from to create and modify IMS data bases. (See IBM publication GH20-1260, "IMS/VS General Information Manual").

A "dependent region" refers to an OS/VS virtual storage region that contains an application program. The application program can take several forms: a Batch Message Processing (BMP) program, an IMS Fast Path (IFP) program, or a Message Processing Program (MPP). (See IBM publication GH20-1260).

Program Specification Block (PSB) is a user-created IMS control block that describes a specific application program—the logical data structures and logical terminals it requires. Partition Specification Table (PST) is an IMS control block that contains dependent region information. PSB Directory (PDIR) contains a pointer to the PSB which contains every Program Communication Block required by the application program. There is a DMB Directory (DDIR) for each data base that is accessible by the application program. Each DDIR contains a pointer to the control block (DMB) that describes one of the accessible data bases. (See IBM publications SH20-9029, "IMS/VS Utilities Reference Manual", and SH20-9026, "IMS/VS Application Programming").

OLDS (OnLine Data Set) is used interchangeably with "IMS system log", and WADS (Write Ahead Data Set) refers to a data set that contains log records which reflect completed operations but which have not yet been written to the "OLDS". (See IBM publication SH20-9029, "IMS/VS Utilities Reference Manual").

Indexed Sequential Access Method (ISAM), Overflow Sequential Access Method (OSAM), and Virtual Storage Access Method (VSAM) are IMS data management access methods. (See IBM publication SH20-9025, "IMS/VS Data Base Administration Guide").

In the configuration of the copending application, the data base is shared between the active and backup processors. Several assumptions have also been made: (1) VTAM and the 3725 NCP support XRF active and backup terminal sessions; (2) the terminal is supported by NCP and VTAM; (3) a DL/I program with access to both DL/I and Fast Path data bases has been loaded into a message-driven dependent region in the "active"; and (4) the "active" is currently processing end-user transactions from the terminal.

Figure 4:
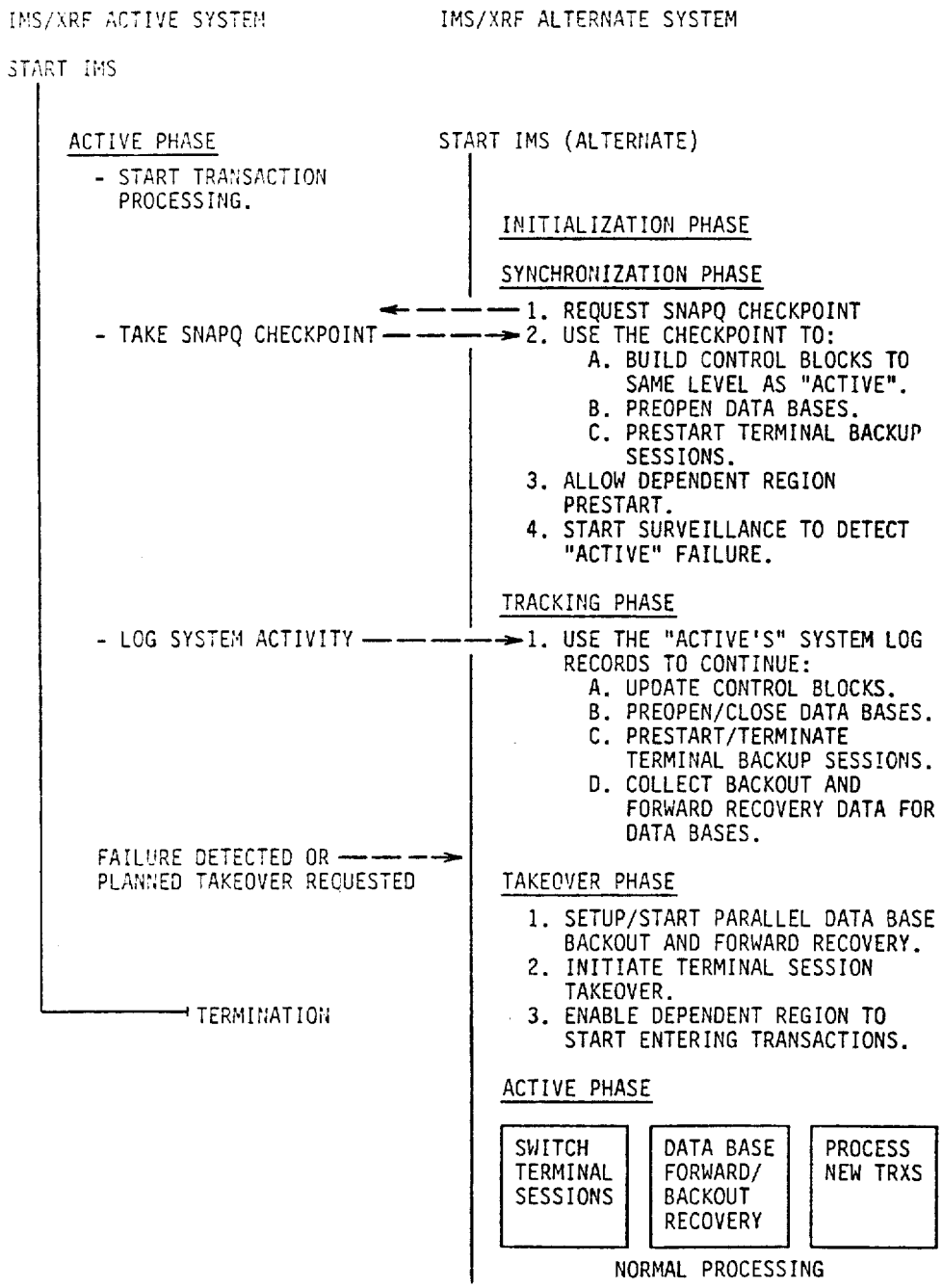
FIG. 4 sets out the phased flow of control between the active and backup processors.

The active processor's IMS log is made available to the backup. The backup processor prepares for an outage by "synchronizing" with the active processor, "tracking it", and "monitoring it" for signs of failure. When the active processor degrades, the backup performs the necessary recovery processing and takes over user-transaction processing responsibility as the "new" active processor. The difference phases performed by the two processors in this respect is depicted in FIG. 4.

The transfer of responsibility includes the making available to the backup processor of all data bases that were available to the active processor, as well as the transfer of active terminal sessions to the backup processor. Thus, the two IMS/VS subsystems shown in FIG. 3 work together to appear as a single active IMS/VS system to the end user.

The backup processor must synchronize itself with the active processor at a specific time so that it can track the active's processing from that point on. In order to synchronize itself with the "active", the "backup" requires that a SNAPQ Checkpoint be taken by the "active". It consists of a set of log records which contains the status of the system at the time the checkpoint was taken. If the "active" has not yet generated this checkpoint, the "backup" has two ways of forcing it to generate one at this time:

1. The "backup" can send a message to the Master Terminal Operator asking the operator to enter a command to the active IMS subsystem, forcing it to issue a SNAPQ Checkpoint. The "backup" waits until the checkpoint arrives on the "active's" system log.

2. Optionally, the "backup" can establish an IMS-managed ISC (VTAM LU6) link between the active and backup subsystems. Once established, the "backup" can use the link to request a SNAPQ Checkpoint.

The use of the SNAPQ Checkpoint log records to get the "backup" in "sync" with the active system leads directly into a "tracking phase" in which the "backup" continues to maintain the "active's" status and recovery information by continuously reading the additional log records generated by the active. This enables the "backup" to always be ready to take over should the "active" fail.

FIGS. 5-7 contain the code that controls the processing of the SNAPQ Checkpoint and all succeeding log records from the active subsystem's log. IMS log records are identified by a four-digit number preceded by "X" (for hex). For example, X'4001' is the Checkpoint log record. The first two digits are the type and the last two digits (when applicable) are the subtype. Looking at FIG. 5, statement 2 is the beginning of the loop that continuously reads the "active's" log until takeover processing stops the "active" from any further log activity. Statement 17 calls a subroutine to read the next log record. The code in FIG. 6 determines what type of log record it is and which module should process it. All SNAPQ Checkpoint records are type '40' records. Type '40' records cause statement 18 to be executed which causes a branch to location "LOG0040". This location can be found in FIG. 7, statement 3. This figure contains the code which determines what type of information is contained in the different SNAPQ Checkpoint records. For example, a '4001' record causes statement 24 to be executed, which causes a branch to location "LOG4001" to do "start of checkpoint" processing. After each log record is processed, control is given back to statement 2 in FIG. 5 so that the next log record can be read.

The monitoring or tracking activity by the "backup" serves three purposes:

1. The "backup" maintains sufficient information about the "active" to enable it to take over. The information maintained allow the "backup" to:

(a) Identify and maintain the current status of the "active's" network—which sessions are active. This information is used to transfer the communications relationship between user and system from the active to the "backup" when a takeover is performed.

(b) Identify and maintain the current status of scheduled application programs. When an application program is scheduled from a terminal, the data base system must load a set of control blocks that support the scheduling function. It must also determine which data bases the application program can access and load the associated data base description and control blocks. When the application program terminates, these control blocks are released. It is therefore necessary for the "active" to inform the "backup" of application program initiation and termination via the system log. This enables the "backup" to have the necessary control blocks loaded for applications that were active at the time of a failure.

(c) Identify and track which data bases are open, which are closed, and which are stopped. To preserve the single-system image to the end user, the "backup" must track the exact state of all of the data bases. This is accomplished by making the "active" log the following data base activities:

data base open/close activities,
data base data set allocation/ deallocation activities, and
data base authorization and share level activities.

This information allows the "backup" to see that data bases that were available to end users at the time of the active subsystem's failure will be available to them after the takeover.

(d) Identify and maintain the current status of "in flight" data base changes to support possible data base recovery processing after a takeover.

(e) Identify and track any data-sharing locks that are currently held by the "active". This is done to allow the "backup", at takeover time, to reacquire locks held by the "active" at the time of the failure. With these locks the "backup", upon taking over for the "active", can allow new transactions to begin in parallel with backout and forward recovery processing (for which the locks were reacquired).

(f) Ensure that the "clock" on the "backup" is not earlier than the "clock" on the "active". This must be done to keep from destroying the integrity of the data bases after a takeover. IMS/XRF logic was added to compare the timestamp of the first record of the SNAPQ Checkpoint to the current time in the "backup". If the "backup's" time is earlier than the "active's" timestamp, an adjustment factor is calculated and applied to all timestamps generated by the "backup". It was also necessary to recalculate the adjustment factor for certain critical logs throughout the Tracking Phase.

2. The "backup" does as much preprocessing as possible in order to speed up the takeover process. The following preprocessing methods were implemented in IMS/XRF to reduce the elapsed time from the failure of the "active" to the enabling of end-user transactions on the "backup":

(a) Initiate backup terminal sessions—The objective here is to transfer the communications relationship between user and system from the active to the "backup" as quickly as possible with little or no disruption to the end user. To minimize network switching time, modification were made to ACF/NCP and to ACF/VTAM to support the establishment of backup terminal sessions concurrent with active sessions and the ability to switch terminal activity to the backup sessions (thus making them the active sessions),and to return session status information to the "backup". Given this support, IMS/XRF contains modifications to allow the "backup" to:

request backup terminal sessions upon receipt of log records from the "active" informing the "backup" that an XRF-capable terminal session has been established, request, at takeover time, a network switch causing each backup session to take over as the active session, and compare the session status information returned from the network switch to the log-derived information in order to recover the communication state with transparency to the end terminal user. This is called "session recovery".

From the terminal user's viewpoint, there is only one session. But from the Network Control Program's viewpoint, there can be two sessions per terminal, only one of which is active.

(b) Preload Application Program Scheduling blocks—The loading of the control blocks that support scheduling for each active application program during a takeover would delay completion of the takeover considerably. The solution here was to modify IMS to log sufficient information so that the "backup" can preload most or all of these blocks during the Tracking Phase.

(c) Preallocate/preopen data bases—To reduce or eliminate the need for the time-consuming process of dynamically allocating and opening data base data sets after the takeover process has begun, the "backup" performs these functions during the Tracking Phase based upon data base status information logged by the "active". When data bases are closed and unallocated by the "active", the "backup" is informed via the system log so that it can follow suit.

(d) Preauthorize data bases—Data base authorization refers to the process of determining, for a potential user, whether or not a data base is accessible. For example, a data base that has been stopped due to a backout failure is not accessible until recovery processing has been completed. By making the "active" log all authorization-related activity, the "backup" can use these logs to drive its authorization processing during the Tracking Phase. IMS/XRF implemented this concept by allowing the "backup" to "inherit" current data base authorizations from the failed "active". In this case, all the "backup" has to do is track the "active's" authorization activity so that it knows what it has inherited.

3. The "backup" executes a surveillance function in order to detect a potential failure in the "active". The "backup" uses several methods to automatically detect a potential failure of the "active". All surveillance mechanisms in IMS/XRF are under direct user control. The user selects which mechanisms to activate and specifies what the time-out values of each shall be. The surveillance mechanisms are:

(a) DASD surveillance—For this mechanism, a data set on shared DASD, which is regularly updated by the "active", is required. IMS/XRF uses its Restart Data Set. The "active" periodically updates a timestamp in the data set. The "backup" periodically checks the timestamp to determine if the user-specified time interval has elasped without the timestamp being updated. If so, takeover decision logic is invoked.

(b) LOG surveillance—The "backup" periodically checks the system log to determine if the user-specified time interval has elapsed since the last log record was received from the "active". If so, takeover decision logic is invoked.

(c) LINK surveillance—IMS/XRF allows an optional LU6 (ISC) link between the two subsystems to be used for surveillance purposes. When the link is used, the "active" sends messages on a regular basis via this link. The "backup" periodically checks the link to see that these messages are still being received. If the user-specified time interval between messages is surpassed, takeover decision logic is invoked.

(d) LOG status surveillance—The "active" generates log records to inform the "backup" of abnormal conditions. This information can then be used by the surveillance function to determine if takeover decision logic should be invoked. Some examples of abnormal conditions might be:
IMS Resource Lock Manager failure,
VTAM failure, or
an IMS abend.

In addition to selecting surveillance mechanisms, the user can also select which combinations of surveillance mechanism failures are to result in a takeover. Furthermore, the user can indicate whether the takeover is to be automatically initiated or whether the Master Terminal Operator is to be informed of the failure. In the latter case, the Master Terminal Operator has the option of initiating the takeover. This takeover decision logic is invoked whenever any of the selected surveillance mechanisms detects a problem.

To prepare for new or rescheduled transaction processing, the backup:

1. Track-user program scheduling activity:

Upon receipt of a PST Status log record (X'47') (from the initial SNAPQ Checkpoint) or of an Application Program Schedule log record (X'08') created by the active subsystem, the alternate subsystem preloads the required DL/I scheduling blocks. When an application program completes and the "active" produces a Program Termination log record (X'07'), the "alternate" releases the corresponding preloaded DL/I scheduling blocks. In this manner, the DL/I program scheduling events occurring in the "active" are mirrored by the alternate subsystem. In the event of a failure of the "active", the "alternate" can take over without the delays caused by loading the required DL/I scheduling blocks.

2. Dependent region reopen:

To eliminate the delays associated with IMS dependent region initialization, dependent regions can be started on the IMS/XRF alternate subsystem during the Tracking Phase. As with IMS/VS Version 1 Release 3, the IMS dependent region "preload" function will be performed. This includes identifying to Virtual Fetch if necessary. After IMS Identify and Sign-on processing which assigns a "PST", the dependent region will wait in the IMS scheduler for takeover. 'MPP' regions will wait on Scheduler Subqueue three and BMPs (including IFPs) will be chained off a wait chain from their master 'PDIR'.

These arrangements allow complete operator control to start, display, and stop using the existing IMS '/DISPLAY A', '/START REGION' and '/STOP REGION' commands. They also provide a means of properly sequencing the start of the IMS dependent regions and transaction processing at takeover.

3. Dependent region preinitialization routines:

To allow users to perform application program initialization in the IMS dependent regions associated with the alternate subsystem before takeover, the ability to exit to user-preinitialization routines has been added. These routines may invoke any MVS service or perform other user processing with the exception of IMS calls.

To prepare for takeover of the active's data bases, the following records are monitored by the backup processor:

1. Data base status tracking:

To preserve the single-system image, the "backup" must track the exact state of all of the data bases and areas. The major log records used to pass data base status from the active to the "backup" are:

X'4006': gives DL/I data base status at time of SNAPQ Checkpoint,

X'4084'/X'4087': gives Fast Path Area status at time of SNAPQ Checkpoint,

X'20'/X'21': gives DL/I data base open and close status changes,

X'5921'/X'5922': gives Fast Path Area open and close status changes,

X'4C04'/X'4C08'/X'4C20'/X'4C40'/X'4C82'/X'4C-C0': gives DL/I data base status changes,and X/'5950': gives Fast Path Area status changes.

Upon receipt of these logs, the backup updates its data base control blocks.

Depending on which status items have changed, the backup may perform additional preparatory tasks. The remaining items in this list describe some of these tasks.

2. Data base/area preallocation and preopen:

To reduce or eliminate the time-consuming process of dynamically allocating and opening the IMS data base/area data sets after a takeover, the backup will attempt to allocate them during the Tracking Phase.

If the preallocation of the data base/area is successful, the backup will also attempt to preopen the data base data or area data sets. A preallocation or preopen failure during the Tracking Phase is not considered an error. Rather, another attempt is made when the data base/area is needed after takeover.

The initial SNAPQ Checkpoint's DDIR Status (X'4006') log records cause the backup subsystem to preallocate and preopen all data bases and area data sets that were allocated and open in the active at the time of the SNAPQ Checkpoint.

Since the active subsystem creates an X'20' or X'5921' log record whenever it opens a data base or area data set and creates an X'21' or X'5922' log record whenever it closes a data base or area data set, the backup subsystem can and does use these log records to cause it to open or close the corresponding data base or area data set.

3. Data base/area authorization and share level tracking:

In order to reduce the process of obtaining IMS data base and area authorization and share level from DBRC during or after a takeover, the backup subsystem tracks the "active's" authorization activity. When the following log records are received, the "backup" transfers the authorization status from the log record to the appropriate data base/area control block:

X'4006' and X'4084' SNAPQ Checkpoint records, and

X'4C08' and X'5950' records.

4. Data base/area first-update tracking:

To eliminate unnecessary DBRC calls at the first update of IMS data bases after takeover, the backup subsystem tracks the update activity occurring in the "active". When the following log records are received, the "backup" transfers the first-update indicator status from the log record to the appropriate data base/area control block.

The DDIR Status (X'4006') SNAPQ Checkpoint log record is used by the "backup" to set its data base first-update indicators the same as those of the "active" at the time of the checkpoint. Thereafter, the following log records are used to track changes to these indicators:

X'50', X'51', and X'52' log records describe a first-update indicator was turned on, and X'4C04' log record describes a first- update indicator that was turned off.

The restart processing of IMS systems prior to IMS/XRF did very little parallel processing. As a result, new-user transactions were not allowed to begin until all DL/I backouts were complete and all Fast Path Forward Recovery processing was complete. In order for IMS/XRF to meet its objective of reducing outage time, modifications had to be made to allow new transactions to be processed as soon as possible and in parallel with Restart Recovery processing. These changes will be discussed as part of the Takeover Phase. What follows are several "tracking" requirements that support starting new work in parallel with DL/I backouts and Fast Path Forward Recovery.

1. Dependent region status tracking:

Even before IMS/XRF, an emergency restarted IMS system had to track activities of the failed system in order to back out uncommitted DL/I changes. This is necessary because DL/I, when processing a transaction, updates the data base as it goes along. After all updates are complete, it then "commits". Thus, if the system fails before the "commit point" is reached, the "uncommitted" data base updates must be backed out. But the need for an XRF backup subsystem to perform DL/I backouts concurrent with the processing of new transactions significantly complicated the tracking problem. In the XRF environment, the PST number no longer uniquely identifies the "Unit of Work" (refers to all DL/I change activity for a dependent region between two consecutive sync points). To eliminate this ambiguity, a recovery token is used.

There is a unique recovery token for each "Unit of Work", and all log records created for a particular "Unit of Work" contain both the PST number and the recovery token.

An earlier section entitled "Track-user program scheduling activity" identified the log records that cause DL/I scheduling blocks to be created and released. Those same log records also drive the backup subsystem to create/release a new block called a Restart PST block (RPST). There is a separate RPST for each unique recovery token. Each RPST contains recovery information for a specific "Unit of Work". The old Restart PST Table from pre-XRF IMS releases has been modified to act as an anchor for RPSTs. Now called a Restart Table, it provides an anchor point for each unique PST number (obtained from the log record). As RPSTs are created, they are chained to other RPSTs with the same PST number, with the first RPST in each chain anchored in the Restart Table (see FIG. 8).

2. DL/I lock tracking:

The backup subsystem tracks the status of the locks for "uncommitted" DL/I data base changes in the active subsystem. This information is used during the Takeover Phase to reacquire these locks so that the restart backouts can run concurrent with new transaction processing. The locks protect the "uncommitted" data base changes from the new transaction processing.

It was necessary to expand the amount of information included on the existing Data Base Change log records and to add a new log record to support this function. The following records will used:

a. X'07'-Application Program Termination log records b. X'27'-Data Set Extend log records
lock type
DCB number
DBD name
data set extension flags c. X'37'- DL/I Commit log records d. X'41'- Application Checkpoint log records e. X'50', X'51', and X'52'- DL/I DB Change log records
region number and recovery token
first segment indicator
root/current segment indicator
block/control interval RBA (relative byte address)
offset within block/control interval
root/segment lock ID f. X'53'- DL/I VSAM Control Interval Split Lock Obtained log record
region number and recovery token
lock obtained indicator
lock value The lock information obtained from these log records is maintained in pools of lock-tracking blocks in the "backup" subsystem using a lock-tracking storage management routine. The pools dynamically expand and contract as dictated by system activity. The information is chained off a hash table which is chained off the system backout PST used to track the associated dependent region activity occurring in the "active" subsystem (see FIG. 9).

After using the region number and recovery token to locate the associated 'PST', the following processing occurs:

a. X'07', X'37' and X'41' log records

When these log records are encountered, all 'entries' chained off of the associated 'PST' are returned to the lock-tracking storage management routine as free space. Should a takeover occur, these locks would not have to be reacquired.

b. X'27' log records

Like the X'50/51/52' log records, the information in the Data Set Extend log records is used to create entries in the hash table reflecting "extend" locks held by the active subsystem.

c. X'50', X'51' and X'52' log records

The information in the DL/I Data Base Change log records is used to create one or more 'entries' chained off the hash table associated with the modifying 'PST' provided they are not duplictes. Duplicates are thrown away. The 'entries' created reflect DL/I locks that were acquired by the active subsystem.

d. X'53' log record

This log record reflects space management activity and, depending on what the activity is, can cause an entry to be added to or deleted from the hash table.

3. DL/I "indoubt" buffer tracking/reduction:

To support DL/I I/O Toleration, it is necessary for the backup to track the ISAM/OSAM block and VSAM control intervals to which the active subsystem could potentially write.

To accomplish this, the following information on the DL/I Data Base Change log records written by the active subsystem is needed:

a. X'07'- Application Program Termination log records b. X'37'- DL/I Commit log records c. X'41'- Application Checkpoint log records d. X'4C01' and X'4C82'- Backout Complete and Backout Failure log records e. X'50' and X'51' - DL/I Data Base Change log records
region number and recovery token
first block indicator
new block indicator
FSE (free space element) count
block/contol interval RBA (relative block address)
DL/I subpool-ID
subpool buffer number f. X'53' - DL/I HD (Hierarchical Direct) Bit Map Update log record
region number and recovery token
block/control interval RBA
DL/I subpool-ID
subpool buffer number.

The DL/I buffer information obtained from these log records is maintained in a pool in the backup subsystem. The pool consists of a group of chained subpool tables (see FIG. 10). There is one table for each ISAM-/OSAM and VSAM subpool used by the "active". Each table is used to track buffers containing "uncommitted" data changes for the associated ISAM/OSAM or VSAM subpool. When "commit" log records are received from the "active", the "uncommitted" flag in the associated table entries is reset. If needed, each table can be expanded up to 255 times to track all of the buffers contained in the associated subpool.

Each 'entry' corresponding to a buffer in a DL/I subpool (see FIG. 11) contains:

a. buffer contents
data base
data set
relative block number b. modifying region bit map.

The Buffer Tracking log record processing is:

a. X'50' and X'51' log records

Each DL/I Data Base Change log record is processed by using the subpool-ID and buffer number to locate the corresponding 'entry'. If the buffer contents match exactly, the modifying PST bit map bit corresponding to the updating region is turned on.

If the buffer contents do not match, the contents of the existing 'entry' are overlayed with the new information and all modifying PST bit map bits are turned off except the one corresponding to the updating region. A complete search of all 'entries' in all tables for this subpool is also performed to check for duplicate buffer contents. If a duplicate if found, that entire 'entry' is zeroed.

b. X'07', X'37', X'38', X'41, and X'4C' log records

Whenever an X'07', X'37', or X'41' log record is encountered, all the entries in all subpool tables are processed. In each 'entry', the modifying PST bit map corresponding to the region "committing" is turned off. If this bit map becomes zero, the entire 'entry' is zeroed indicating that the block/control interval would not have to be tolerated if a takeover were to occur. When an X'4C01' or X'4C82' log record is encountered, the above bit map logic is performed only on the entry whose data base name matches that found in the log record.

c. X'53' log record

A Bit Map Update log record is processed by zeroing the entire 'entry' located using the subpool-ID and buffer number.

4. Fast Path "indoubt" buffer reduction:

Unlike DL/I, Fast Path does not write to the data base until all changes have been logged ("committed"). It is possible for the system to fail after logging the changes but before the data base is updated. Fast Path "indoubt" buffers represent logged changes that may not have been written to the data base before the active subsystem failed. Forward Recovery is the task of writing these "indoubt" changes to the data base in case the "active" was unable to do so before failing.

In order for IMS/XRF to reduce the time of a takeover in a Fast Path environment, it was crucial to reduce the number of "indoubt" Fast Path Area control intervals during their emergency restart forward recovery processing. This was accomplished by modifying the active subsystem's sync point-asynchronous buffer write process to maintain a 'write pending' bit in the DMHR (a control block associated with the buffer).

Figure 12:
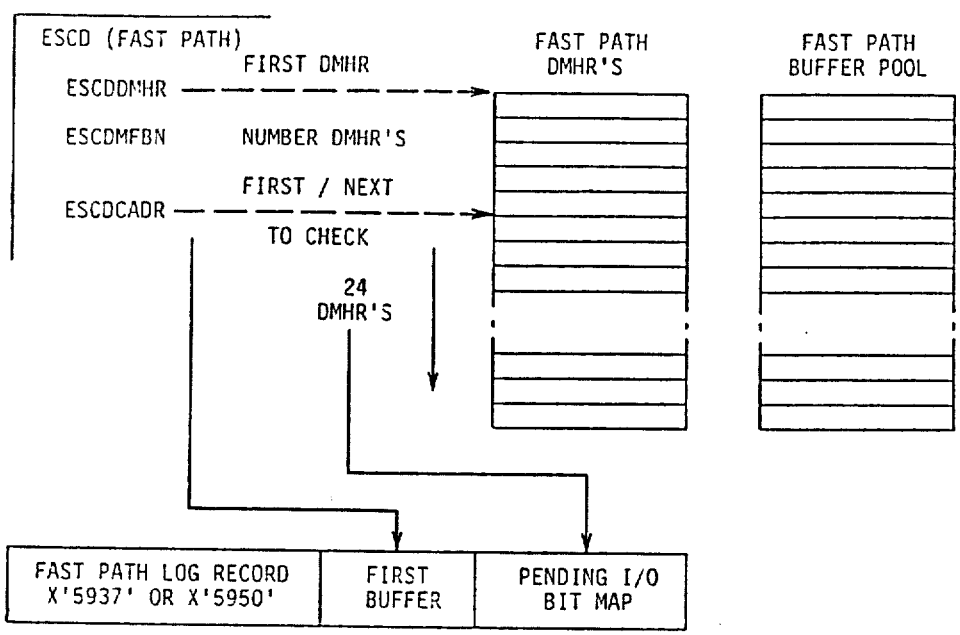
FIG. 12 shows a Fast Path "indoubt" buffer reduction.

Whenever a Fast Path Area Change log record (X'5950') or Fast Path Commit log record (X'5937') is generated, this bit from 24 "sequential" DMHRs is combined to form a 3-byte bit map, and the 3-byte buffer number for the first DMHR checked is placed in a reserved area in these log records. A field controlling the first DMHR to be checked is then updated so that the next log record will check the next 24 "sequential" DMHRs. This results in all Fast Path buffers being swept in a cyclic fashion periodically so that completed I/O can be detected. FIG. 12 illustrates this technique.

Whenever the backup subsystem processes these log records, it uses the first buffer number to locate the corresponding DMHR and then processes the pending I/O bit map. For every bit that is off, it clears a Forward Recovery required flag in the corresponding DMHR. During the processing of the Area Change log record, this flag is turned on in the DMHR associated with the control interval being changed. When Forward Recovery runs during takeover, only DMHRs with this bit on need be processed. This scheme significantly reduces the number of control intervals which must be read and thus reduces the time of takeover.

Figure 13:
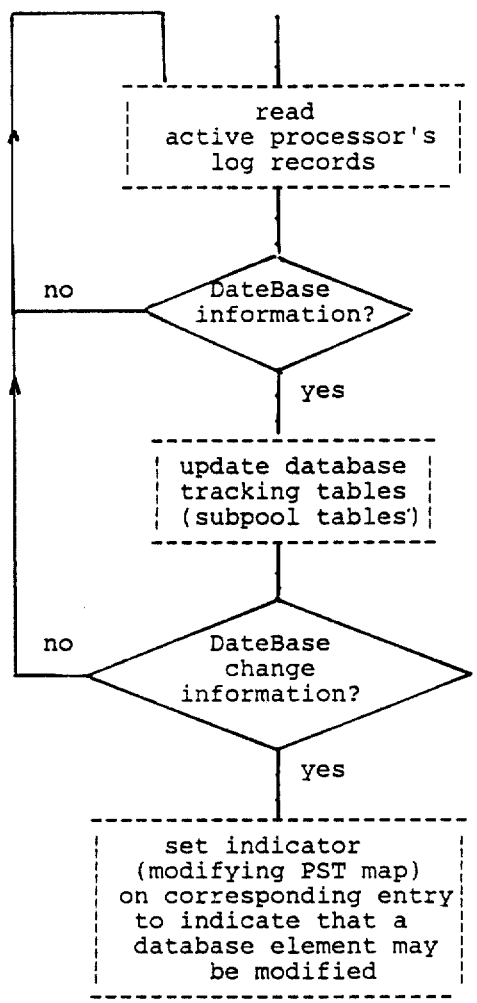
FIG. 13 illustrates the steps performed by the backup during the tracking phase to facilitate early restart.
Figure 15:
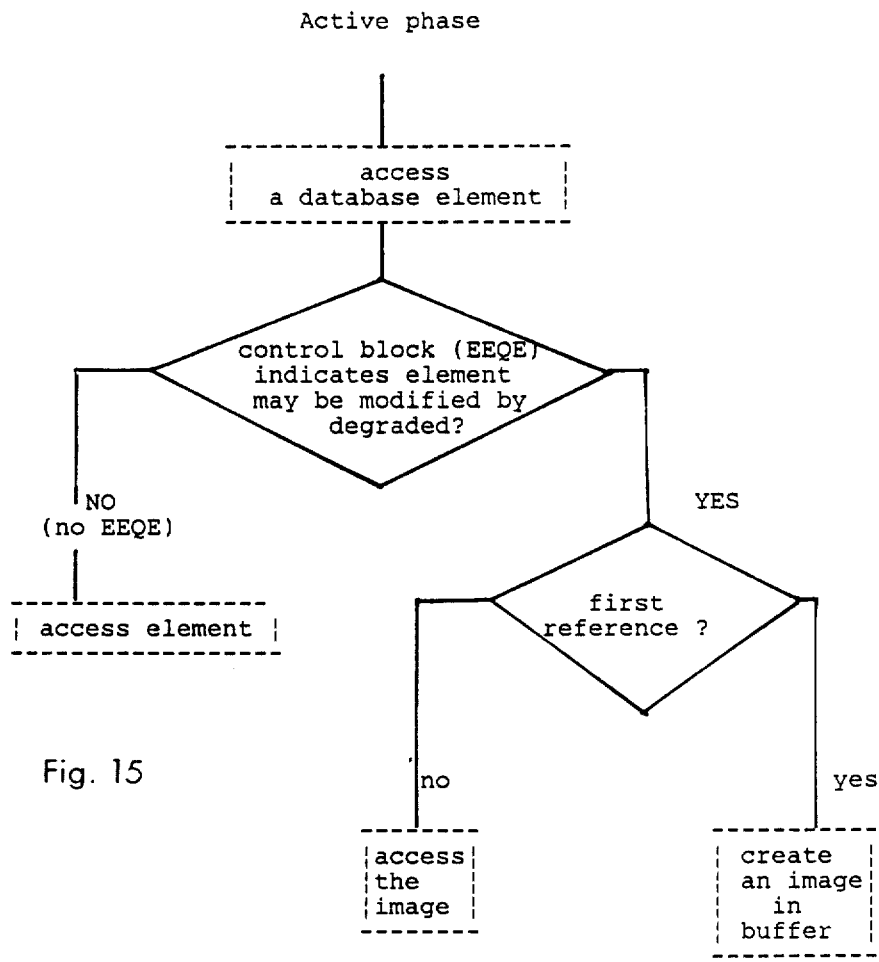
FIG. 15 illustrates the steps performed by the backup during the active phase to facilitate early restart.

Briefly summed, while the backup processor 102 is reading the log 103 of the active processor 101 during the tracking phase, it uses the log information to maintain a group of chained subpool tables 105 as shown in FIG. 10. Each subpool table is used to track buffers of a DL/I subpool which contains "uncommitted" data changes for the associated ISAM/OSAM or VSAM subpool, and it comprises entries each of which contains the name and locaction of a data set element together with a modifying PST (region) bit map as shown in FIG. 11. Each bit in the modifying PST bit map identifies a PST (region) which may update the data set element. For Fast Path processing, the backup processor 102 maintains a "write pending" bit, as shown in FIG. 12, in the DMHR (a control block associated with the buffer) of a corresponding "indoubt" Fast Path Control Interval where forward recovery is needed. These logic steps by the backup processor are summarized by the flow chart in FIG. 13.

Figure 14:
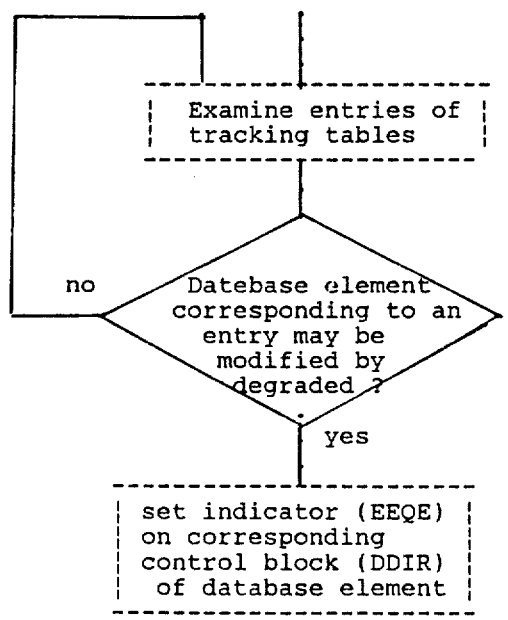
FIG. 14 illustrates the steps performed by the backup during the takeover phase to facilitate early restart.

Upon switchover, the backup processor examines each subpool table maintained during the tracking phase. For each entry in a subpool table which has a nonzero modifying PST bit map, a control block, which is hereinafter called an Extended Error Queue Element (EEQE), is created and put in a chain pointed to by the corresponding DDIR. The logic steps performed by the backup processor during this phase are depicted by the flow chart in FIG. 14.

When an EEQE is created, the name and location of the data set element for which an EEQE is created are logged to ensure their recoverability in case of a system failure.

In such heretofore proposed IMS/VS systems, if access to a data set element of a data base is needed by the backup processor after switchover, the backup processor first accesses the corresponding DDIR. From the accessed DDIR, the backup processor searches for an EEQE corresponding to the data set element and, depending upon the result of the search, performs one of the following functions:

(a) Normal, no EEQE found—The data set element is not updatable by the degraded processor. Reference of the data set element is made to the data base directly.

(b) EEQE found, first reference—The data set element, which is updatable by the degraded processor, is referenced by the backup processor for the first time. The backup processor restores the data set element and copies it to a buffer in the Extended Control Service Area (ECSA). ECSA is a work area provided by the MVS extended architecture (XA). The address of the buffer area where the image is located is saved in the EEQE so that all subsequent references of the data set element can be diverted to this buffer area.

(c) EEQE found, not first reference—The data set element, which is updatable by the degraded processor, has previously been referenced by the backup processor and thus an image of the data element has already been created in the ECSA. The address of the image is obtained from the EEQE. References and updates to the data set elements are then diverted to the image of the data set element in the ECSA. To enable recoverability in the event of a breakdown of the backup processor, all updates made to the images are logged.

In the prior art of IMS/VS, when the degraded processor finishes all the updates, a notification is sent to the operator.

When the backup processor in this invention is informed that the degraded processor has completed all I/Os to the data base, it then copies the image of each data set element from the ECSA back to the data base.

Data Availability During Access Errors

While the method of using an EEQE to divert references to an image created in the buffer can be used to maintain availability of the data base in the event of processing switchover, it should be apparent that the method can also be used to maintain system availability of a data base system during the occurrence of an access error in the data base.

When an access error occurs in the data base during the referencing of a data set element, an EEQE is created and put in a chain pointed to by the DDIR of the data base. A copy of the affected data set element is then created and copied into the IMS Extended Control Service Area (ECSA). The creation of the EEQE, together with the name and location of the affected data set element, is logged to ensure recoverability. When references and updates to the affected data set element are needed, the EEQE, which is accessed with the corresponding acquiring of the DDIR, causes the references to be diverted to the buffer copy of the data set element in the ECSA. If the update is made to the affected data set element, it is also logged to ensure recoverability.

If, during its normal operation, IMS successfully write to the data base area previously affected by an access error, the data set element is then restored and copied back into staged storage.

We claim:

1. A method for maintaining data availability in a data base system having backup and active processors, said system utilizing staged storage and logging facilities, comprising the steps by a backup processor of:

(a) ascertaining the names and locations of the data set elements in staged storage which are updatable by the active processor, and upon the passing of control from a degraded active processor to the backup processor, logging the ascertained names and locations;

(b) ascertaining whether the degraded active processor ceases to perform updates to staged storage;

(c) upon the first reference to each data set element in staged storage by said backup processor, copying said referenced element to a buffer, diverting subsequent references from staged storage to the buffer copy, logging each update to said copy, the steps of copying, diverting, and logging being repeated until indication of said degraded active processor ceases to perform updates to staged storage; and (d) writing the buffer contents back to staged storage.

2. A method for maintaining data availability in a restartable data base system, said system utilizing staged storage and logging facilities, said data availability being extended to those data sets having associated therewith access errors, comprising the steps of:

(a) responsive to each access error, creating a concordance of the affected data set name, location, and error type, copying said affected data to another staged storage location, and logging the concordance and a copy of the affected data to staged storage; said logging also being invoked at periodic checkpoints;

(b) diverting subsequent references from staged storage to the buffer copy, logging each update to said copy, the steps of copying, diverting, and logging being repeated until said access error becomes resolved;

(c) in the event of system restart, restoring the concordance and the affected data from the log to staged storage; and (d) restoring said error by successfully writing the buffer contents back to staged storage.

* * * * *